Figure 1:
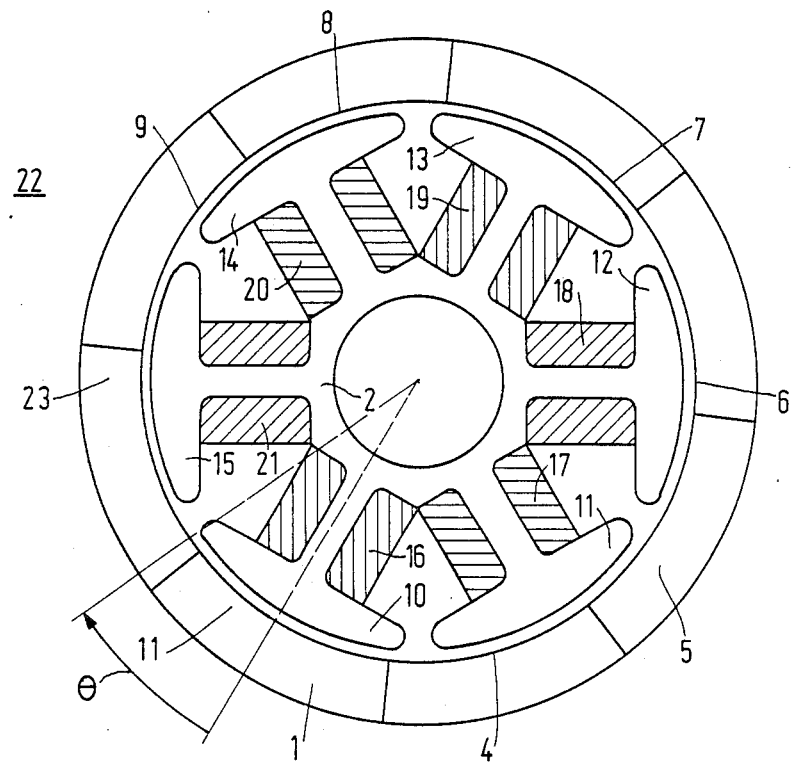

United States Patent [19]

Janssen

[11] Patent Number: 4,703,236
[45] Date of Patent: Oct. 27, 1987

[54] BRUSHLESS D.C. MOTOR

[75] Inventor: Johannes H. H. Janssen, Eindhoven, Netherlands

[73] Assignee: U.S. Philips Corporation, New York, N.Y.

[21] Appl. No.: 848,504

[22] Filed: Apr. 7, 1986

[30] Foreign Application Priority Data

Nov. 26, 1985 [NL] Netherlands ............... 8503249

[51] Int. Cl.$^4$ ............................................. H02P 6/02
[52] U.S. Cl. ................................... 318/254; 318/139; 318/439
[58] Field of Search ................ 318/138, 254, 439

[56] References Cited

FOREIGN PATENT DOCUMENTS

| 3526007 | 1/1986 | Fed. Rep. of Germany | 318/254 |
| 55-46890 | 4/1980 | Japan | 318/254 |
| 57-43588 | 3/1982 | Japan | 318/254 |
| 58-26584 | 2/1983 | Japan | 318/254 |

*Primary Examiner*—Bernard Roskoski
*Assistant Examiner*—Bentsu Ro
*Attorney, Agent, or Firm*—Robert T. Mayer; Bernard Franzblau

[57] ABSTRACT

A brushless d.c. motor comprises a commutation device by means of which the stator coils are connected to and disconnected from a direct-voltage source in a cyclic switching pattern for energizing said stator coils. In order to reduce torque variations as a result of transient effects in the energizing currents during commutation, the commutation device comprises means which cause the instants of disconnection and connection to be shifted by a fixed time interval relative to one another.

10 Claims, 7 Drawing Figures

BRUSHLESS D.C. MOTOR

This invention relates to a brushless d.c. motor comprising a permanent magnetic rotor and a stator made of a magnetizable material in which a plurality of stator coils are arranged between at least three terminals. An electron commutation device is provided by means of which the terminals can be connected and disconnected from one of the two poles of a direct-voltage source in a cyclic switching pattern for energizing the stator coils. At least one of the poles of the direct-voltage source is disconnected from a terminal and is connected to another terminal during the commutation intervals.

Such a d.c. motor is disclosed in U.K. Patent Application GB 2061038. The construction of such a motor allows relatively simple-to-mechanize production procedure since they have suitable control characteristics, such d.c. motors are frequently employed in mass products for accurate speed control of specific components, as for example in audio and video recorders. A drawback of such a motor having a magnetizable stator is the high self-inductance of the stator coils. These high self-inductances give rise to transient effects with comparatively large time constants in the energizing currents, the transient effects in their turn causing variations in the driving torque.

These torque variations render this type of motor less suitable for use where an extremely stable motor speed is required, such as for example a drive motor for the rotating play back and recording heads of video recorders, where the maximum permissible speed variations are of the order of $10^{-4}$ times the nominal speed.

It is an object of the invention to provide a d.c. motor of the type defined in the opening paragraph having an improved stability of the driving torque.

According to the invention this is achieved in a d.c. motor of the type defined in the opening paragraph in that the d.c. motor is provided with control means which, in order to reduce variations in motor torque as a result of transient effects in the energizing currents during commutation, cause the instants of disconnection and connection within a commutation interval to be shifted by a specific time interval relative to one another.

The invention is based on the discovery that the shift in time enables torque variations caused by a disconnection to be substantially compensated by means of torque variations caused by establishing a connection, as a result of which the stability of the motor torque and hence the stability of the motor speed are improved substantially.

From the European patent application No. 0,043,138 it is known to delay the de-energization of a stator coil during commutation of a brushless d.c. motor for a specific time relative to the energization of the next stator coil, but this step is applied in order to preclude breakdown of the switching transistors of the electronic commutation circuit, enabling the flywheel diodes to be dispensed with.

Further, U.S. Pat. No. 4,412,159 describes a two-phase brushless d.c. motor in which the energizing intervals for the two phases partly overlap one another. However, this step serves to compensate for the unfavourable torque angle characteristic in the commutation range, resulting in a torque reduction which is characteristic of a two-phase motor.

Figure 2:
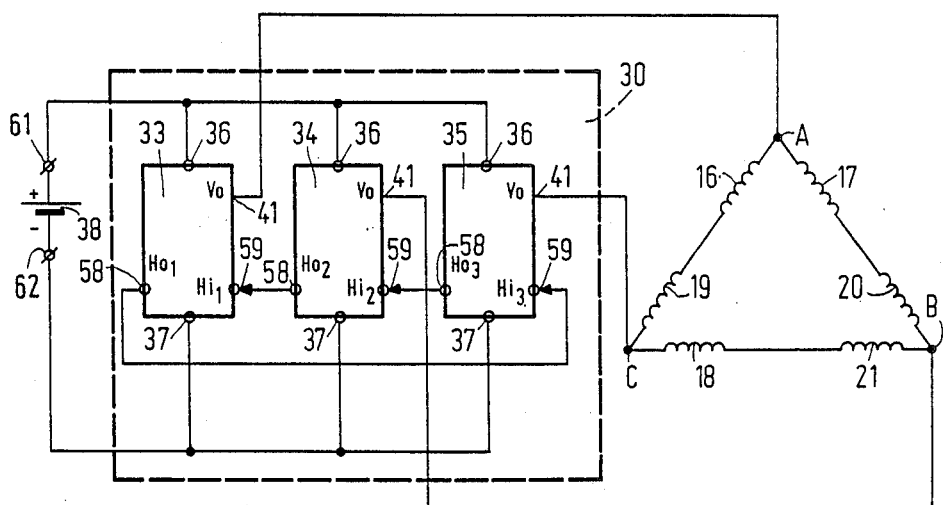
Figure 3:
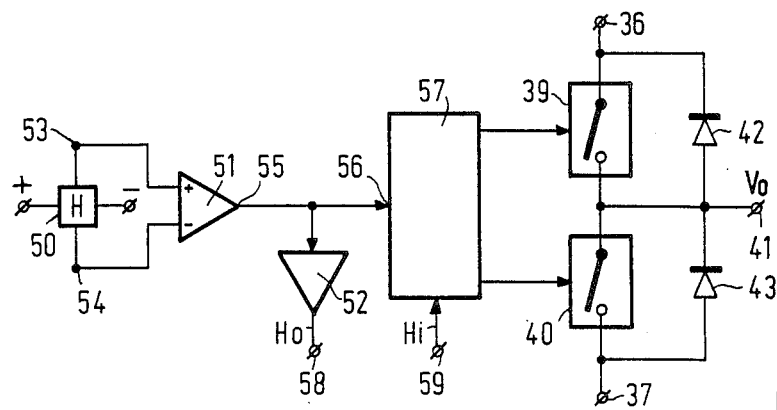
Figure 4:
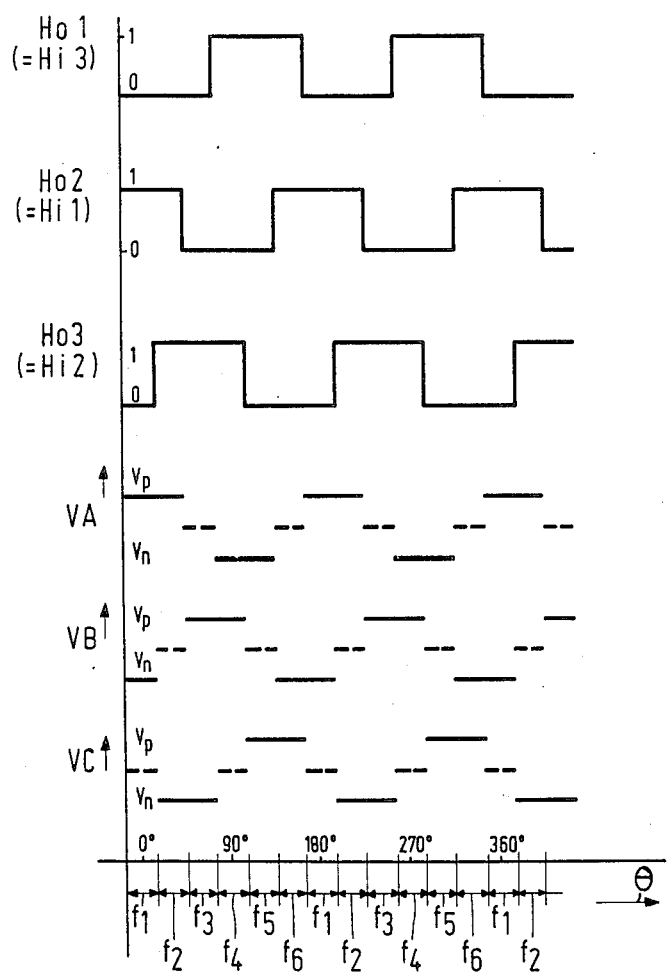
Figure 5:
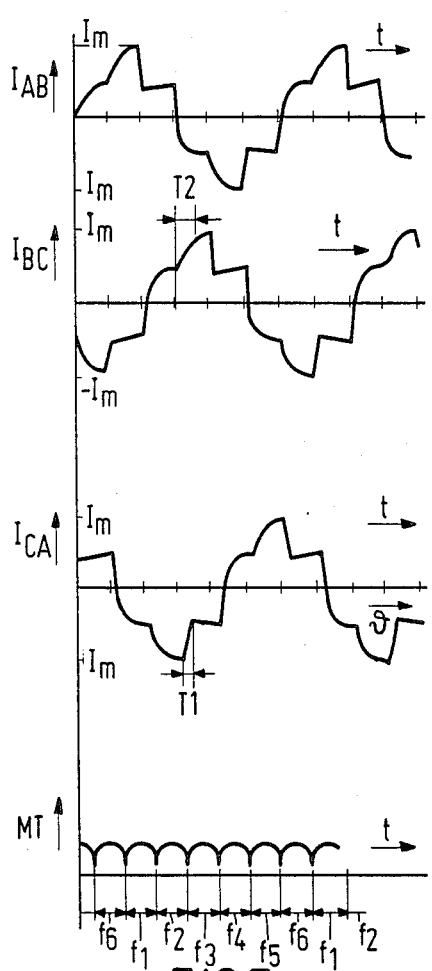
Figure 6:
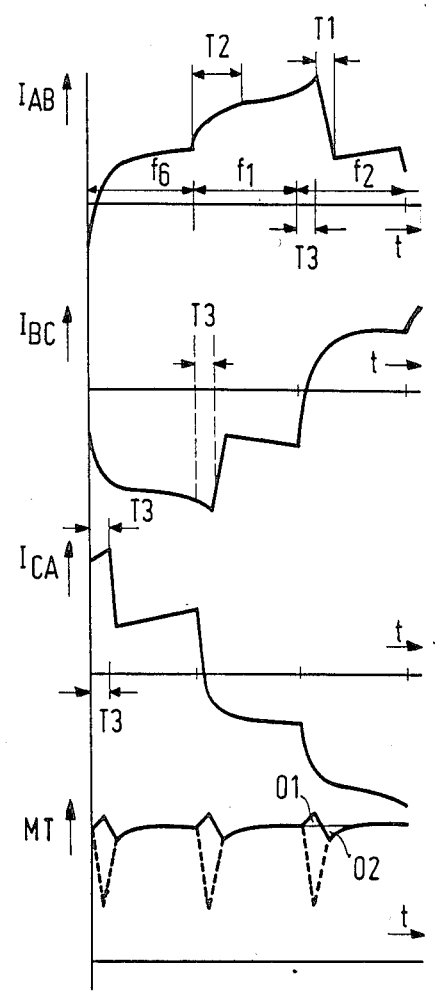
Figure 7:
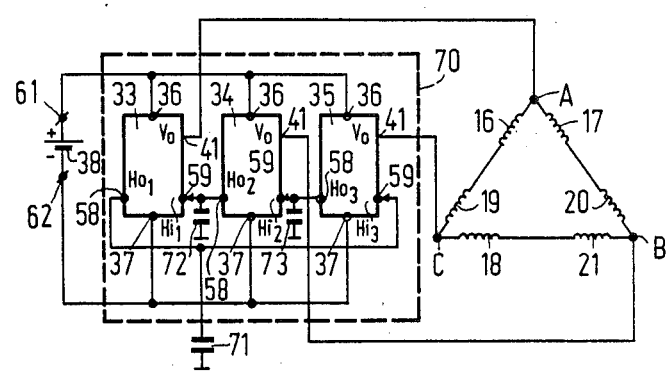

Embodiments of the invention and further advantages thereof will now be described in more detail, by way of example, with reference to FIGS. 1 to 7 of the drawing in which FIG. 1 is a sectional view showing the mechanical construction of a brushless d.c. motor of a customary type, FIG. 2 is the circuit diagram of the brushless d.c. motor, FIG. 3 shows a magnetically controllable switching means forming part of the commutation device of the motor, FIG. 4 shows some signal waveforms appearing in the commutation device as a function of the rotor position, FIGS. 5 and 6 show the stator currents and the motor torque produced by the stator currents as a function of time, and FIG. 7 is a circuit diagram of an advantageous embodiment of the invention.

FIG. 1 is a sectional view of a brushless d.c. motor 22 of a customary-type, comprising a cylindrical rotor 1 of a permanent-magnet material which is arranged to be rotatable around a ferromagnetic stator 2. The angle between the rotor 1 and the stator 2 is designated $\theta$. The stator 2 comprises six stator teeth 10 ... 15 which are sixty degrees spaced from each other and which comprise shoe-shaped ends. Directly opposite the shoe-shaped ends of the stator teeth 10 ... 15 are four magnetic northpoles 5, 7, 9, 11 and four magnetic southpoles 4, 6, 8, 23 which are spaced equidistantly along the rotor circumference. The stator teeth 10 ... 15 constitute the cores of the stator coils 16 ... 21 respectively, which can be connected between three terminals A, B and C in a manner as shown in FIG. 2. The stator coils 16 and 19 are arranged in series between the terminals A and C. The stator coils 17 and 20 are arranged in series between the terminal A and the terminal B. The stator coils 18 and 21 are arranged in series between the terminal B and the terminal C. The terminals A, B and C are connected to a commutation device 30 by means of which each of the terminals A, B and C can be connected to a positive pole 61 or a negative pole 62 of a direct voltage source 38. For this purpose the commutation device comprises three identical magnetically controlled switching means 33, 34 and 35. Each of the switching means (see FIG. 3) comprises a first electronic switch 39 and a second electronic switch 40. The first switch 39 is connected between the first input terminal 36 and an output terminal 41 and the second switch 40 is connected between a second input terminal 37 and the output terminal 41. The switches 39 and 40 are shunted by a freewheel diode 42 and a freewheel diode 43, respectively.

Each switching device further comprises a Hall detector 50, a comparator circuit 51, an output amplifier 52 and a control circuit 57. The outputs 53, 54 of the Hall detectors are connected to the positive input and the negative input respectively of the comparator circuit 51. The output signal Ho on the output 55 is applied to an input 56 of the control circuit 57 and to an output 58 of the switching means via the unity gain output amplifier 52. The input signal Hi on the input 59 of the switching means is applied to the control circuit 57.

Depending on the direction of the detected magnetic field the Hall detector 50 generates a difference voltage between the outputs 53 and 54. The Hall detector 50 and the comparator circuit 51 are adapted to one another in such a way that the comparator circuit 51 generates a logic "1" signal if a magnetic north pole is situated above the detection surface of the detector 50 and generates a logic "0" signal if a magnetic south pole is situated above the detection surface. The control circuit 57 opens or closes the switches 39 and 40 depending on the input signal Hi and the signal Ho. Table 1 represents the states of the switches 39 and 40 as a function of Hi and Ho.

| Hi | Ho | state switch 39 | state switch 40 |
|----|----|----|----|
| 1 | 1 | open | open |
| 1 | 0 | closed | open |
| 0 | 1 | open | closed |
| 0 | 0 | open | open |

In the commutation device 30 shown in FIG. 2 the signals Ho1, Ho2, Ho3 on the outputs 58 of the switching means 33, 34, and 35 respectively are applied to the inputs 59 of the switching means 35, 33 and 34 respectively to function as the signals Hi3, Hi1 and Hi2 for the switching means 35, 33 and 34 respectively. The outputs 41 of the switching means 33, 34 and 35 are connected to output terminals A, B and C respectively. The input terminals 36 of the switching means 33, 34 and 35 are connected to the positive pole of the direct voltage source 38 and the input terminals 37 are connected to the negative pole of the direct voltage source 38.

The individual switching means 33, 34 and 35 are symmetrically secured to the stator 2 in a customary manner at such short distances that they can be controlled in a cyclic sequence by the magnetic field produced by the rotor 1. FIG. 4 shows the signals Ho1, Ho2, and Ho3 produced by the switching means 33, 34 and 35 on the output 58 as a function of the rotor position. The signals Ho1, Ho2 and Ho3 are identical to the signals Hi3, Hi1 and Hi2 respectively on the inputs 59 of the switching means 35, 33 and 34.

The successive commutation phases are designated f1 ... f6. FIG. 4 also shows the waveforms of the voltages VA, VB and VC on the terminals A, B and C respectively. The voltage VA on the terminal A is determined by the states of the switches 39 and 40 of the switching means 33, which switches are controlled by the signals Ho1 and Hi1 (=Ho2). If the signals Ho1 and Hi1 have the same logic values the switches 39 and 40 are open so that the terminal A is completely disconnected from the voltage source 38. This happens during the phases f3 and f6. The voltage on the terminal A is then indeterminate, which is represented by the broken line. If Ho1=0 and Hi1=1 (as during f1 and f2) the switch 39 is maintained in the closed state. The voltage VA is then equal to the voltage Vp on the positive pole 61 of the voltage source 38. If Ho1=1 and Hi1=0 (as during f4 and f5) the switch 40 is maintained in the closed state. The voltage on the terminal is then equal to voltage Vn on the negative terminal of the voltage source 38. Similarly, the voltage VB is determined by the signals Ho2 and Hi2 and the voltage VC by the signals Ho3 and Hi3.

FIG. 5 shows the currents through the stator coils as a function of time for a constant mechanical load on the motor 22. In this Figure IAB is the current which flows from terminal A to terminal B. IBC is the current from terminal B to terminal C, an ICA is the current from terminal C to terminal A. During the commutation phase f1 the voltage difference between the terminals A and B is equal to the terminal voltage of the direct voltage source 38. During this phase the current IAB increases to a value Im.

During the transition from phase f1 to f2 the negative pole of the voltage source 38 is disconnected from the terminal B and connected to the terminal C, so that the current IAB decreases to a value ½Im. During the phase transition f2, f3 the positive pole of the voltage source 38 is disconnected from the terminal A and connected to the terminal B. As a result of this, the current decreaes further to the value $-\frac{1}{2}$Im. During the phase transition f3, f4 the negative pole is disconnected from the terminal C and connected to the terminal A. The terminals A and B are then connected directly to the negative pole 62 and the positive pole 61 respectively. The current IAB now decreases to a minimum value $-$Im. Subsequently, IAB increases again to its maximum value Im during the consecutive phases f5, f6 and f7.

The currents IBC and ICA vary in the same way as the current IAB. However, the currents IBC and ICA are phase-shifted by 120° and 240° respectively relative to the current IAB. Each of the currents IAB, IBC and ICA provides a contribution MA, MB and MC respectively to the driving torque MT of the motor 22. The contribution MA to the torque MT may be expressed as $MA = K \cdot IAB \cdot f(2\theta)$. Herein $f(2\theta)$ is a periodic function of $2\theta$. Further $f(2\theta)$ is approximately equal to $\cos(2\theta)$.

The contributions MB and MC to the torque MT are given by $MB = K \cdot IBC \cdot f(2\theta - 120°)$ and $MC = K \cdot ICA \cdot f(2\theta - 240°)$. The sum MT of the contributions MA, MB and MC is also shown in FIG. 5.

At the phase transitions the driving torque MT is generated mainly by two or three currents. At the phase transition from f2 to f3 these are the currents IBC and ICA. At this instant $2\theta$ is 90°, so that the contribution MA produced by IAB is substantially zero.

At the phase transition from f2 to f3 the current during the transition is mainly caused by the disconnection of terminal A. The voltages induced in the coils 16, 17, 19 and 20 as a result of the disconnection turn on the flywheel diode 43 of the switching means 33 which is arranged between the terminal A and the negative pole 62, so that the voltage on the terminal A decreases by a step which is substantially equal to the terminal voltage of the voltage source 38. As a result of this, the current ICA decreases rapidly at a rate which is dictated mainly by the magnitude of this step and the time constant, which is governed by the coil parameters. At the same time the current IAB increases rapidly as a result of said stepwise voltage variation on the terminal A. After a short time T1 the currents have become equal to one another, after which the freewheel diode between the terminal A and the negative pole 62 is turned off. At this instant the currents IAB and ICA have substantially reached their final values. Subsequently, the currents IAB and ICA change at a slower rate until they have reached their final values. The variations in the current IBC at a phase transition from f2 to f3 mainly depend on the stepwise voltage variation caused by making the connection between the positive pole 61 and the terminal B and on the time constant T2, which is governed by the coil parameters. This stepwise voltage variation on terminal B is only a fraction of the stepwise voltage variation on the terminal A caused by disconnection, so that the current IBC varies only slowly in comparison with the current ICA. As a result of these differences the torque contribution MC dictated by ICA has already substantially decreased briefly after the phase transition, while the torque contribution MB governed by ICB has increased to a small extent only. This results in negative peak-shaped variations of the torque MT at the phase transitions.

In accordance with the invention the instant of opening the switch for the purpose of disconnection is delayed by a time interval T3 with respect to the instant of closure of the switch for the purpose of connection in the embodiment described above. FIG. 6 shows the currents IAB, IBC and ICA which then occur. As a result of the inventive step the torque reduction caused by opening the switch is delayed until the substantially slower torque increase caused by closure of the switch has attained a sufficiently high value. The influence of this step on the torque MT is also illustrated in FIG. 6. Moreover, for the sake of clarity, the torque variation without the step is represented in a broken line. As will be apparent from FIG. 6, the torque variations at the phase transitions are reduced substantially by the use of the inventive step. The step has an optimum effect if T3 is selected in such a way that the average value of the torque variations caused by the transition effects is zero (area 01=area 02 in FIG. 6).

FIG. 7 shows a commutation circuit 70 which is attractive because of its simplicity, in which circuit during a phase transition the instant of opening the switch is delayed by a fixed time interval T3 relative to the instant of closure of the switch. The commutation device 70 is substantially identical to the commutation device 30. However, in the commutation device 70 outputs 58 of each of the switching means 33, 34 and 35 are connected to zero potential via capacitors 71, 72 and 73 respectively. As a result of this, the signals Ho1, Ho2 and Ho3 on the outputs 58 are transferred to the inputs 59 with a delay so that the instant at which the switches are opened (which instant is dictated exclusively by a level transition in one of the signals Hi1, Hi2 and Hi3 on the inputs 59) is delayed. The capacitance C is selected in such a way that the delay corresponds to the value T3.

In the present embodiment a shift in time is obtained by delaying control signals with the aid of capacitors. However, it is obvious that this is only one of the many possibilities for obtaining the time shift.

The invention was illustrated by a description of a 3-phase 8-pole brushless d.c. motor, in which the stator coils are arranged in delta. However, the invention is equally applicable to brushless d.c. motors with a larger number of phases or another number of poles, or motors in which the stator coils are not arranged in delta but, for example, in star.

What is claimed is:

1. A brushless d.c. motor comprising a permanent-magnet rotor, a stator made of a magnetizable material on which a plurality of stator coils are arranged, said coils being connected between at least three terminals, and an electronic commutation device by means of which the terminals can be connected to and disconnected from one of two poles of a direct-voltage source in a cyclic switching pattern for energizing the stator coils, at least one of the poles of the direct-voltage source being disconnected from a terminal and being connected to another terminal during commutation intervals, and control means which, in order to reduce variations in motor torque as a result of transient effects in the energizing currents during commutation, cause the instants of disconnection and connection within a commutation interval to be shifted by a specific time interval relative to one another such that, the average values of said torque variations during the commutation intervals are substantially zero in comparison to the average value of the motor torque outside the commutation intervals.

2. A d.c. motor as claimed in claim 1 wherein the d.c. motor comprises a three-phase motor.

3. A d.c. motor as claimed in claim 1, wherein the transient effect as a result of disconnection is damped more rapidly than the transient effect as a result of connection, characterized in that the control means include delay means which cause the instant of disconnection to be delayed by a predetermined time interval relative to the instant of connection.

4. A brushless d.c. motor comprising: permanent magnet rotor, a ferromagnetic stator having at least three stator coils connected to at least three terminals, a magnetically controlled electronic commutation device including a plurality of switching devices for cyclically connecting and disconnecting said three terminals to the positive and negative terminals of a source of d.c. voltage for supplying energizing currents to the stator coils in a cyclic pattern, said switching devices disconnecting at least one terminal of said d.c. voltage source from one of said three terminals and connecting it to another one of said three terminals during a commutation interval, and delay means coupled to the switching devices so that the switching devices cause the instants of disconnection and connection within a commutation interval to be shifted by a specific time interval relative to one another so as to reduce variations in motor torque during commutation intervals to an average value of zero in relation to the average value of the motor torque outside of said commutation intervals.

5. A motor as claimed in claim 4 wherein each switching device includes a magnetically responsive element and said elements are adapted to be arranged on the stator with angularly uniform spacing about the motor axis so as to be controlled by the rotor magnetic field in a cyclic sequence as the rotor rotates.

6. A motor as claimed in claim 4 wherein each switching device comprises: first and second input terminals connected to the positive and negative terminals, respectively, of the d.c. voltage source and an output terminal connected to a respective one of said three terminals, first and second electronically controlled switches connected between said first and second input terminals, respectively, and the output terminal, and first and second flywheel diodes connected in parallel with said first and second switches, respectively.

7. A motor as claimed in claim 6 wherein each switching device further comprises a Hall device for sensing the rotor magnetic field and a control circuit responsive to an output signal of its Hall device and to an output signal of a Hall device of another one of the switching devices for selectively operating its first and second switches.

8. A motor as claimed in claim 4 wherein said delay means comprises a plurality of capacitors individually coupled to respective ones of the switching devices.

9. An electronic commutation device for a d.c. motor having a permanent magnet rotor and a ferromagnetic stator having at least three stator coils connected to three terminals, said device comprising: a plurality of switching devices for cyclically connecting and disconnecting said three terminals to the positive and negative terminals of a source of d.c. voltage for supplying energizing currents to the stator coils in a cyclic pattern, said switching devices disconnecting at least one terminal of the d.c. voltage source from one of said three terminals and connecting it to another one of said three terminals during a commutation interval, and delay means coupled to the switching devices so that, during said commutation interval, the switching devices open a connection from a terminal of the d.c. voltage source to one of the three terminals and close a connection from said terminal of the d.c. voltage source to another one of the three terminals with a time delay therebetween such that variations in motor torque during the commutation intervals will be reduced to an average value of zero in relation to the average value of the motor torque outside of said commutation intervals.

10. An electronic commutation device as claimed in claim 9 wherein each switching device comprises: first and second input terminals connected to the positive and negative terminals, respectively, of the d.c. voltage source and an output terminal connected to a respective one of said three terminals, first and second electronically controlled switches connected between said first and second input terminals, respectively, and the output terminal, a Hall device for sensing the rotor magnetic field, and a logic circuit having a first input for a logic signal $H_O$ from its Hall device and a second input for a logic signal $H_I$ from the Hall device of another one of the switching devices, wherein said logic circuit controls its first and second switches in accordance with the following table:

| $H_I$ | $H_O$ | First Switch | Second Switch |
|---|---|---|---|
| 1 | 1 | open | open |
| 1 | 0 | closed | open |
| 0 | 1 | open | closed |
| 0 | 0 | open | open. |

* * * * *